United States Patent [19]

Kammerer

[11] Patent Number: 4,504,154

[45] Date of Patent: Mar. 12, 1985

[54] INDEXING ELEMENT FOR SWITCHING A CHRONOMETER

[75] Inventor: Gerd Kammerer, St. Georgen, Fed. Rep. of Germany

[73] Assignee: Dieter Graesslin Feinwerktechnik, Fed. Rep. of Germany

[21] Appl. No.: 452,799

[22] Filed: Dec. 23, 1982

Foreign Application Priority Data

Dec. 9, 1981 [DE] Fed. Rep. of Germany ......... 8148703

[51] Int. Cl.[3] ...................... H01H 43/00; G05B 19/06; G04C 21/00; G04C 23/00

[52] U.S. Cl. ................................. 368/74; 200/38 BA; 200/38 CA; 368/254

[58] Field of Search ......................... 200/27 R-27 BA, 200/38 BA, 38 CA, 35 R; 368/62, 71, 73, 74, 76, 77, 223, 228, 232-236, 250, 254, 256, 269, 70, 72, 75, 252

[56] References Cited

U.S. PATENT DOCUMENTS

| | | | |
|---|---|---|---|
| 1,801,129 | 4/1931 | Warren | 200/35 R |
| 2,671,148 | 3/1954 | Schulenburg | 200/30 R X |
| 2,874,239 | 2/1959 | Doneit | 200/27 B X |
| 2,905,777 | 9/1959 | Gayring | 200/38 BA |
| 3,783,599 | 1/1974 | Tanaka | 368/74 |

FOREIGN PATENT DOCUMENTS

| | | |
|---|---|---|
| 160225 | 1/1904 | Fed. Rep. of Germany . |
| 1125042 | 3/1962 | Fed. Rep. of Germany . |
| 2235584 | 2/1973 | Fed. Rep. of Germany . |
| 2813069 | 3/1978 | Fed. Rep. of Germany . |

*Primary Examiner*—J. R. Scott
*Attorney, Agent, or Firm*—Hill, Van Santen, Steadman & Simpson

[57] ABSTRACT

An indexing unit in the form of a disc or an endless tape for switching chronometers has a number of programmable switch tabs disposed at an edge of the element forming a unitary structure, the switch tabs being depressable against the influence of a restoring force for positioning selected tabs in at least one programming position for actuating a separate switch device for switching a chronometer. The indexing element is comprised of flexible foil having a number of uniformly spaced incisions at an edge thereof. Each tab formed between successive incisions has a free end which may be pressed behind a retaining element for programming the indexing element.

28 Claims, 12 Drawing Figures

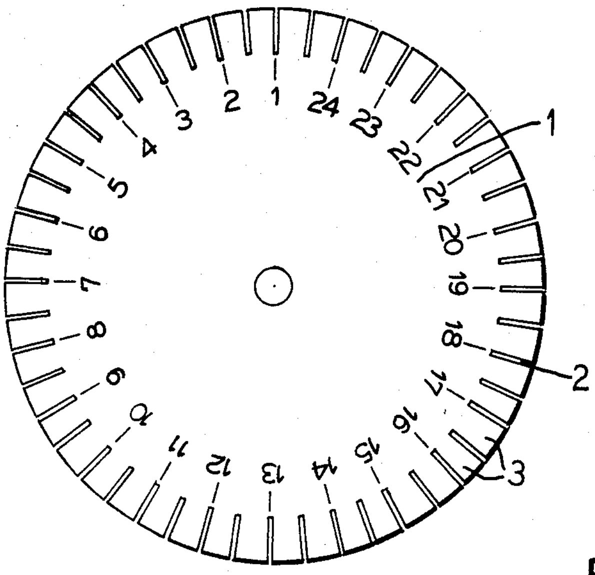
FIG. 1
FIG. 2
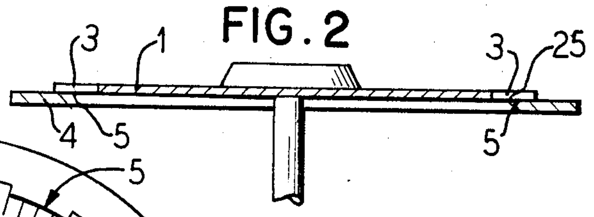
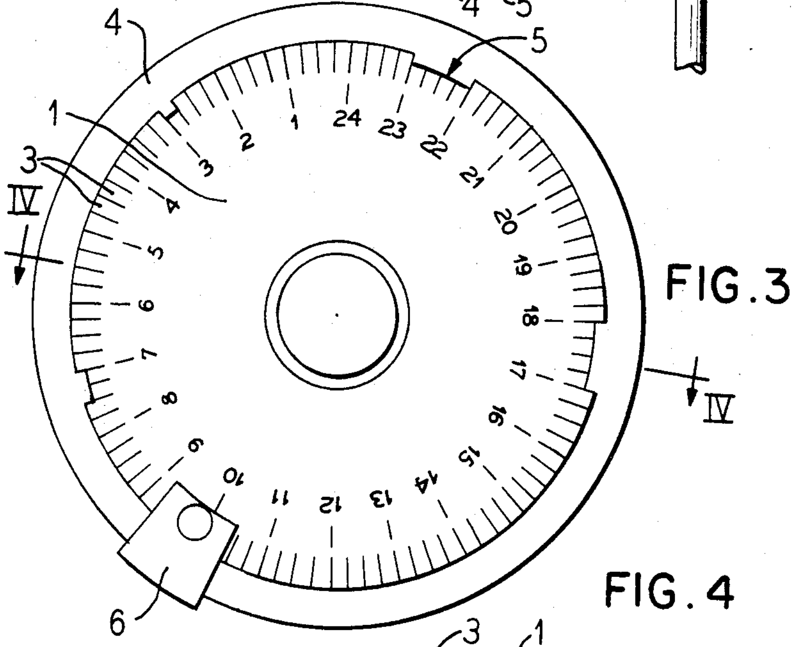
FIG. 3
FIG. 4
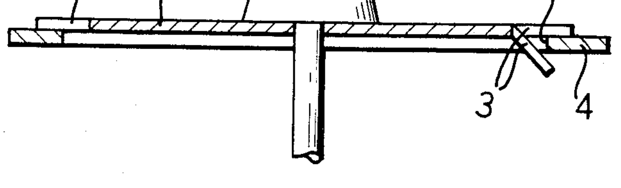

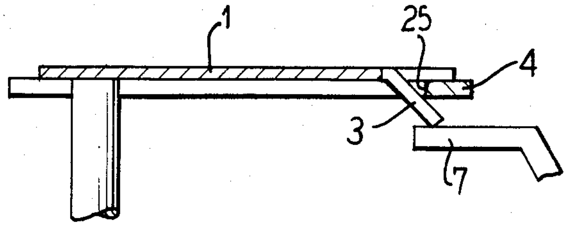
FIG. 5
FIG. 6
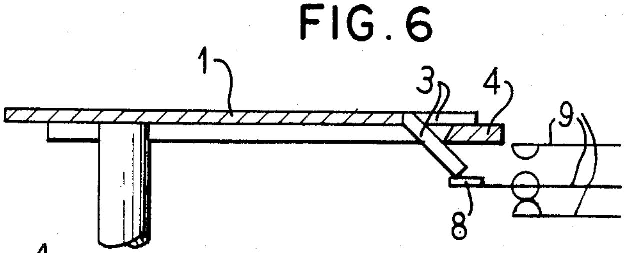
FIG. 7
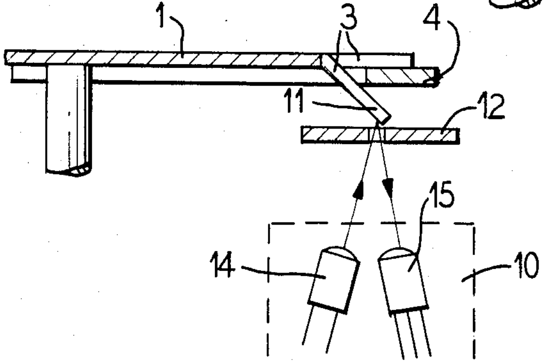
FIG. 8
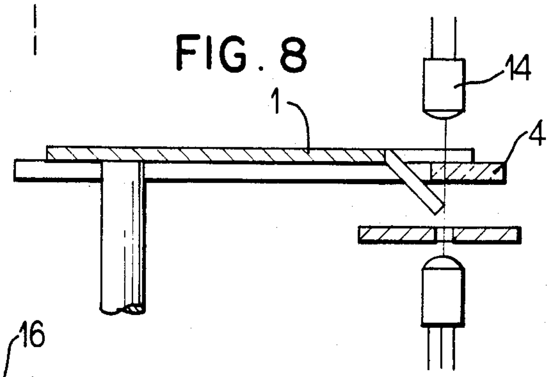
FIG. 9
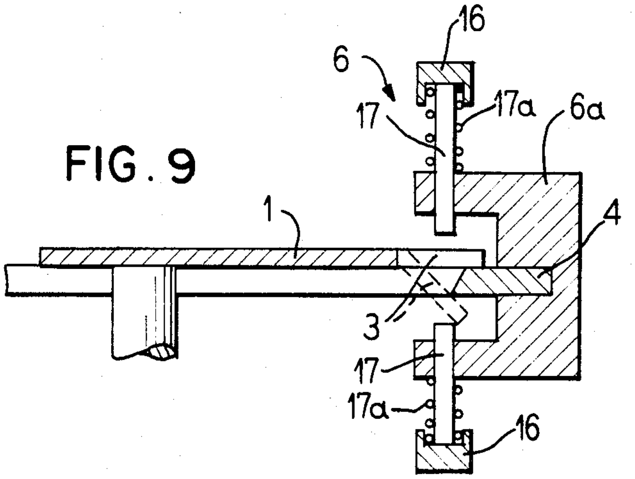

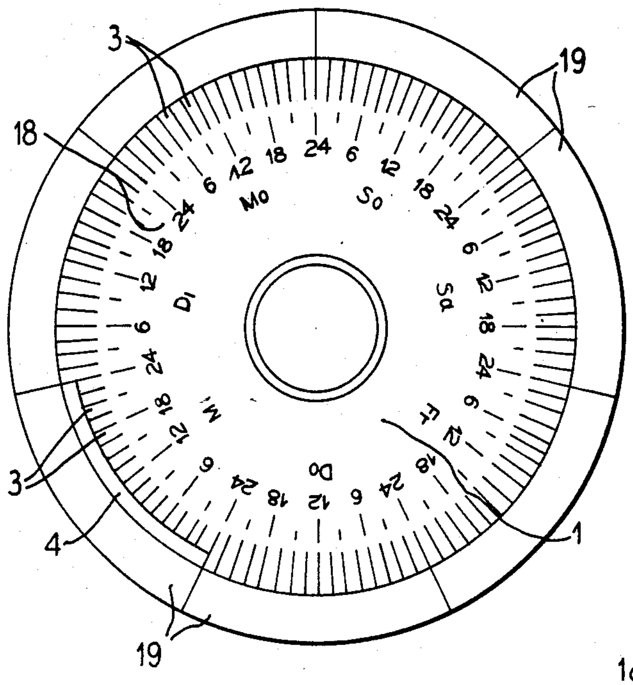
FIG. 10
FIG. 12
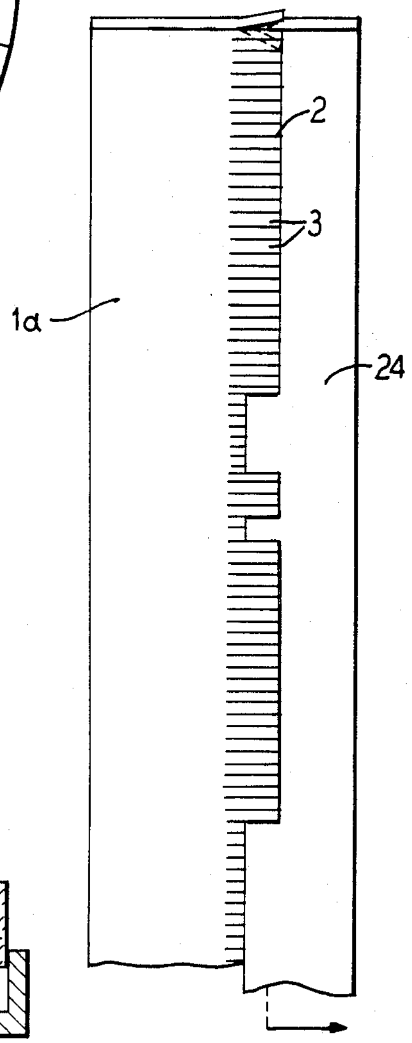
FIG. 11
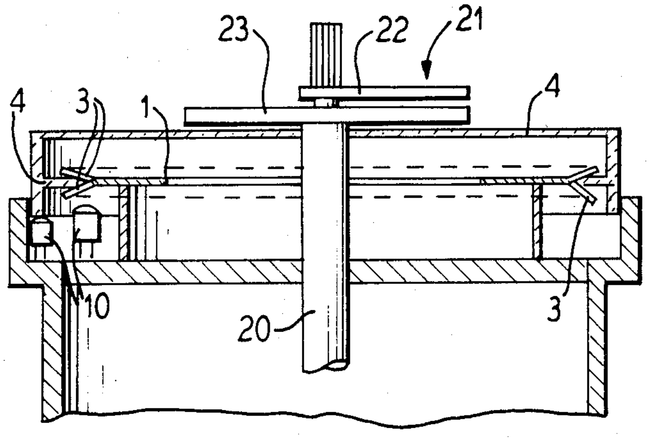

INDEXING ELEMENT FOR SWITCHING A CHRONOMETER

BACKGROUND OF THE INVENTION

1. Field of the Invention

The present invention relates to indexing elements for controlling the sequence of operation of a chronometer-controlled device, and in particular to such an indexing element which is selectively programmable for actuating a switch means in the chronometer.

2. Description of the Prior Art

An indexing element in the form of a disc, particularly for use in switch clocks, is disclosed in German OS No. 2,813,069. The indexing disc disclosed therein is manufactured from thermoplastic material by injection molding and exhibits cam-like switch fingers connected to the indexing disc in the form of thin lamellae so as to form a one-piece structure. In order to program the indexing disc, the fingers are pressed axially behind an annular retaining edge of the indexing disc against a restoring force resulting from the elastic spring characteristics of the lamellae. Depression of a selected finger causes actuation of electrical contacts of a stationary switch means as the disc is rotated.

The conventional indexing disc described in German OS No. 2,813,069 has the disadvantage of requiring relatively involved tooling steps for manufacturing the disc. Moreover, the economically attainable width or division of the individual switch fingers, which determines the minimum chronological graduation between two switch instructions relative to one another, are relatively large such that the minimum time unit division available for programming is relatively large and is thus frequently not sufficiently fine to satisfy operating requirements.

SUMMARY OF THE INVENTION

It is an object of the present invention to provide an indexing element for controlling the sequence of operation of a chronometer-controlled device which can be economically manufactured and which has divisions between successive switch fingers sufficiently small to chronologically program fine time unit steps.

It is a further object of the present invention to provide an indexing element wherein the individual switch fingers can be programmed and subsequently cancelled individually or as part of a complete switching program.

It is a further object of the present invention to provide an indexing element which permits resetting of the switch fingers to an initial, nonprogrammed position individually and in combination.

The above objects are inventively achieved in an indexing element in the form of a disc or an endless tape comprised of flexible foil, an edge of the indexing element being provided with a plurality of incisions which are uniformly spaced from one another so as to form a plurality of switching tabs exposed between successive incisions. The indexing element has a unitary structure with the free ends of the switching tabs being depressible behind a retaining edge connected to the indexing element for the purpose of programming.

The indexing element may be manufactured of metal or a synthetic foil, having a thickness in the range of approximately 0.3 through 0.6 mm. The exposed switch tabs at the edge of the indexing element formed by the incisions can be disposed in very tight proximity to one another such that a division of approximately 0.3 mm can be achieved if the indexing element is in the form of a disc having a diameter of approximately 65 mm. Thus a sufficiently fine subdivision step can be achieved which, related to a cyclical movement of the indexing element (one revolution per week if the indexing element is a disc) permits a programmable switching time spacing between two switching instructions of 15 minutes.

Sensing of the programmed switch tabs for actuating a switch means can be undertaken mechanically by means of a ratchet mechanism, may be undertaken electrically by means of a wiper, or may be undertaken opto-electronically by means of a light barrier.

The indexing element disclosed and claimed herein can not only be simply and economically manufactured by stamping or injection molding, particularly in the embodiment of the indexing element comprised of synthetic material, but also exhibits a sufficiently small division of the individual switch tabs relative to one another such that fine-stepped programming can be attained therewith. Additionally, the switch tabs are easily programmed by simply pressing a free end of a tab behind a retaining element by means of an auxiliary awl-like tool. In order to cancel portions of a program, the individual switch tabs comprising the portion of the program to be cancelled can be simply individually pressed in an opposite direction to return the tabs to their initial unprogrammed position. If cancellation of the entire program is desired, the retaining element can simply be pressed downwardly thereby releasing all of the switch tabs and permitting the tabs to spring back to their initial unprogrammed position in the plane of the indexing element.

DESCRIPTION OF THE DRAWINGS

FIG. 1 is a plan view of an indexing element constructed in accordance with the principles of the present invention.

FIG. 2 is a cross-sectional view of an indexing element with a retaining element in an unprogrammed condition.

FIG. 3 is a plan view of an indexing element and a retaining element constructed in accordance with the principles of the present invention in a programmed condition.

FIG. 4 is a sectional view taken along IV—IV of FIG. 3.

FIG. 5 is a cross-sectional view of a portion of a programmed indexing element for mechanical sensing of the switch tabs.

FIG. 6 is a cross-sectional view of a portion of a programmed indexing element constructed in accordance with the principles of the present invention for electrical sensing of the switch tabs.

FIG. 7 is a cross-sectional view of a portion of a programmed indexing element constructed in accordance with the principles of the present invention in a first embodiment for opto-electronic sensing of the switch tabs.

FIG. 8 is a cross-sectional view of a portion of a programmed indexing element constructed in accordance with the principles of the present invention in a second embodiment for opto-electronic sensing of the switch tabs.

FIG. 9 is a cross-sectional view of a portion of an indexing element constructed in accordance with the principles of the present invention with a programming slide attached thereto.

FIG. 10 is a plan view of an indexing element constructed in accordance with the principles of the present invention programmed for a weekly program.

FIG. 11 is a cross-sectional view of an indexing element constructed in accordance with the principles of the present invention arranged in combination with a switch clock having a coaxially disposed dial means.

FIG. 12 is a cross-sectional view of an indexing element constructed in accordance with the principles of the present invention in the form of an endless tape.

DESCRIPTION OF THE PREFERRED EMBODIMENTS

An indexing element in the form of a disc 1 constructed in accordance with the principles of the present invention is shown in FIG. 1. The disc 1 consists of flexible foil of a metallic or synthetic material and may have a thickness in the range of approximately 0.3 through 0.6 mm. The indexing disc 1 has a plurality of finely spaced radial incisions 2 having a small division relative to one another in the range of approximately 0.3 through 2.5 mm. The incisions 2 expose lamella-like switch tabs 3 which are connected at one end to the indexing disc 1 thereby forming a unitary structure. If the indexing disc 1 has a diameter of, for example, 60 mm, the incisions 2 may be in the range of 4 through 5 mm in length. This length accordingly corresponds to the free length of the switch tabs 3. The incisions 3 may be manufactured without material erosion, however, it is preferable to provide a small air gap between the individual switch tabs 3 in the area of the incisions 2, the air gap proceeding along the entire incision depth.

The flexible foil comprising the indexing disc 1 is springy and elastic. The unloaded or unprogrammed idle position of the switch tabs 3 is flush with the remainder of the indexing disc 1.

The indexing disc 1 with the switch tabs 3 may be manufactured by stamping or, if the disc 1 is comprised of synthetic material, may be manufactured by injection molding.

As shown in FIG. 2, the indexing disc 1 is seated on a retaining element 4 in the form of a ring with the switch tabs 3 resting against the retaining element 4. The retaining element 4 can rotate with the indexing disc 1, or may be disposed stationary relative thereto. The spatial disposition of the indexing disc 1 relative to the retaining element 4 in FIG. 2 shows the unprogrammed condition of the switch tabs 3 of the indexing disc 1 relative to the retaining element 4.

When the indexing disc 1 is to be programmed, selected individual switch tabs 3 are depressed in conformity with the switching program behind the interior lower edge 5 of the retaining element 4, as shown in FIG. 3. Such programming of the switch tabs 3 can be undertaken with a pointed pin, a pencil, a ballpoint pen, or any other awl-like tool, or with a specially designed programming means which can be attached to the indexing disc 1 and the retaining element 4 for programming the indexing disc 1 and thereafter removed. Such a programming means is shown in FIG. 3 referenced at 6 and is attached so as to be rotatably disposed in the area of the circumference of the indexing disc 1 on the retaining element 4. Further details of the programming means 6 are described below in connection with FIG. 9.

FIG. 4 is a sectional view showing a programmed or depressed switch tab 3. In such a programmed state, the switch tabs 3 may be sensed by any number of means. As shown in FIG. 5, such sensing may be undertaken by a direct mechanical displacement of a sensing finger 4 connected to a switching device, such as a ratchet mechanism, of the type well known to those skilled in the art and not illustrated in greater detail. For this purpose, the indexing disc 1 with the programmed switch tabs 3 rotates past the sensing finger 7. Movement of the sensing finger 7 upon encountering a depressed switch tab 3 causes electrical contacts to be actuated in the switching device connected thereto. Depending upon the particular application of the indexing device disclosed herein, a depressed or programmed switch tab 3 may initiate a switch-on function, while the unprogrammed switch tabs 3 may initiate a switch-off function, or vice versa.

As shown in FIG. 6, the programmed switch tabs 3 may be electrically sensed by a wiper 8. Such electrical sensing may be undertaken directly, if the switch tabs 3 are themselves electrically conductive, or may be undertaken indirectly as shown in FIG. 6. In the indirect case, the wiper 8 closes a contact 9 when engaged by one of the depressed switch tabs 3. It will be understood by those skilled in the art, however, that engagement of the wiper 8 with a depressed switch tab 3 may open a normally-closed contact, or may cause switch-over of a movable contact between two stationary contacts.

Two embodiments for opto-electronic sensing of the switch tabs 3 are shown in FIG. 7 and 8. The first embodiment shown in FIG. 7 includes a so-called reflection light barrier 10 having a light emitter 14 and a light receiver 15 which respectively direct light toward and receive reflected light from a depressed switch tab 3 on the indexing disc 1. For this purpose, a reflective surface 11 may be provided on the underside of the switch tabs 3. A slotted mask 12 may also be disposed between the tabs 3 and the light barrier 10.

A second opto-electronic sensing embodiment for use in combination with the indexing element 1 disclosed and claimed herein is shown in FIG. 8. In this embodiment, the switch tabs 3 are coated with opaque material and the light source 14 and light receiver 15 are disposed such that only a programmed or depressed switch tab 3 permits transmission of light between the source 14 and the receiver 15 through a slotted mask 12. In this embodiment, the retaining element 14 is also opaquely designed.

A programming means 6 for programming the indexing disc 1 is shown in detail in FIG. 9. The programming means 6 has a carrier body 6$a$ having two programming pins 17 slidably extending therethrough on opposite sides of the indexing disc 1. Each pin 17 has a spring 17$a$ coiled thereabout and a push-button cap 16 mounted at one end thereof. The pin 17 disposed at the top of the indexing disc 1 is for programming the indexing disc 1 by depression of the push-button cap 16, and the pin 17 disposed beneath the indexing disc 1 is for cancelling a previously-programmed switch tab 3 by depression of the lower push-button cap 16. The programming means 6 may be stationarily disposed with respect to the chronometer device in which the indexing disc 1 is utilized or may be rotatably mounted relative to the indexing disc 1. The indexing means may also be portable so as to be attachable to the indexing disc 1 for the purpose of programming or cancelling a program, and may thereafter be removed.

An indexing disc 1 connected in combination with a dial face 18 with a corresponding dial face division for a particular rotational speed of the indexing disc 1 of one revolution per week is shown in FIG. 10. The switch tabs 3 are accordingly fine-stepped, that is, designed and disposed with small divisions relative to one another. As also shown in FIG. 10, the retaining element 4 in the form of a ring may be comprised of a selected number of individual segments 19 (seven such segments in the embodiment of FIG. 10). For the purpose of cancelling the switching program, each individual segment 19 may be manually axially displaced. The individual segments 19 are seated so as to be axially resilient. The sector width of the individual segments 19 may, for example, correspond to the program range of one day, 12 hours, or one hour. For this purpose, it is necessary that coincidence between the indexing disc 1 and a particular segment be observed, particularly when the retaining element 4 is stationarily disposed relative to the indexing disc 1. If the retaining element 4 has positive entrainment, such a setting will not be required.

The use of an indexing disc 1 in a switch clock is shown in FIG. 11. The indexing disc 1 is seated on a shaft 20 which is driven by a suitable timer means of the type known to those skilled in the art and not shown in greater detail. An analog dial mechanism 21 having a minute hand 22 and an hour hand 23 is coaxially connected to the indexing disc 1. For this purpose, the indexing disc 1 may be in the form of a ring rotatable around the dial mechanism 20. The retaining element 4, closed at the front side thereof, may be transparent in order to permit a dial face on the indexing disc 1 to be viewed. An opto-electronic sensing means of the type shown in detail in FIG. 7 may be employed.

In a further embodiment of the invention, the indexing element may be in the form of an endless tape 1*a* as shown in FIG. 12. In this embodiment, the endless tape 1*a* has a plurality of incisions 2 at one edge thereof. The switch tabs 3 formed between the incisions 2 are programmed by depressing the switch tabs 3 beneath a stationary guide rail 24. The guide rail 24 is axially displaceable so that the entire program may be cancelled by axial displacement of the guide rail 24.

In all embodiments of the invention, the retaining element 4 may form a unit with a housing for the indexing element, and in fact may be manufactured therewith as a unitary structure.

As shown in FIG. 2, the interior surface 25 of the retaining element 4 may be angled outwardly having a smallest diameter at the lower edge 5 such that the surface 25 forms a thin truncated cone of increasing diameter in a direction away from the disk 1.

Although other modifications and changes may be suggested by those skilled in the art it is the intention of the inventor to embody within the patent warranted hereon all changes and modifications as reasonably and properly come within the scope of his contribution to the art.

I claim as my invention:

1. A programmable indexing device for controlling the sequence of operation of a chronometer comprising:

a continuously movable indexing element having a plurality of spaced incisions at an edge thereof forming a plurality of switch tabs between successive incisions, said indexing element consisting of flexible foil;

a retaining element disposed adjacent to said edge of said indexing element such that said switch tabs in an unprogrammed position slightly overlap said retaining element selected ones of said switch tabs being depressable against a restoring force and being held in a depressed programmed position beneath said retaining element for actuating a sensing device in said chronometer, said switch tabs being releasable from beneath said retaining element for return to said unprogrammed position by said restoring force for re-programming; and a programming means having a pair of programming elements respectively disposed on opposite sides of said edge of said indexing element, said programming elements being individually actuatable for programming and for releasing said switch tabs.

2. The indexing device of claim 1 wherein said indexing element consists of metal.

3. The indexing device of claim 1 wherein said indexing element consists of a synthetic material.

4. The indexing device of claim 1 wherein said incisions in said indexing device are uniformly spaced.

5. The indexing device of claim 1 wherein said indexing element is a disc and wherein said incisions are radial incisions in said disc.

6. The indexing device of claim 5 wherein said retaining element is a ring disposed adjacent to the periphery of said indexing disc.

7. The indexing device of claim 6 further comprising a dial mechanism having a minute hand and an hour hand coaxially mounted relative to said indexing element.

8. The indexing device of claim 1 further comprising a dial mechanism and wherein said indexing element in the form of a ring is rotatable around said dial mechanism.

9. The indexing device of claim 1 wherein said indexing element is in the form of an endless tape.

10. The indexing device of claim 1 wherein said indexing element has a plurality of air gaps between each of said switch tabs at the locations of said incisions.

11. The indexing device of claim 1 wherein said retaining element is comovable with said indexing element.

12. The indexing device of claim 1 wherein said retaining element is stationarily disposed with respect to said indexing element.

13. The indexing device of claim 1 wherein said chronometer has a housing and wherein said retaining element is connected to said housing.

14. The indexing device of claim 1 wherein said retaining element has an angled interior surface, said interior surface proceeding at an angle from a lowest edge thereof in a direction away from said indexing element.

15. The indexing device of claim 1 wherein said sensing means is a mechanical sensing means.

16. The indexing device of claim 1 wherein said sensing means is an electrical sensing means having a wiper.

17. The indexing device of claim 16 wherein said switch tabs on said indexing element are electrically conductive for making electrical contact with said wiper.

18. The indexing device of claim 16 wherein said wiper is displaceable by a depressed switch tab for actuating an electrical contact.

19. The indexing device of claim 1 wherein said sensing means is an opto-electronic sensing means.

20. The indexing device of claim 19 wherein said opto-electronic sensing means has a light source disposed on one side of said switch tabs and a light receiver disposed on an opposite side of said switch tabs, such that a depressed switch tab permits transmission of light between said light source and said light receiver, said switch tabs otherwise blocking transmission of light therebetween.

21. The indexing device of claim 19 wherein said opto-electronic sensing means comprises a light source and a light receiver both disposed beneath said switch tabs, and a reflective surface carried on a bottom of each of said switch tabs such that light from said light source is reflected by said reflective surface on a depressed switch tab to said light receiver.

22. The indexing disc of claim 1 wherein said programming means is rotatably mounted with respect to said indexing element.

23. The indexing device of claim 1 wherein said retaining element is axially displaceable for simultaneously returning all depressed switch tabs to an initial unprogrammed position for cancelling an entire switching program.

24. The indexing device of claim 1 wherein said retaining element is divided into a plurality of axially displaceable segments for cancelling a portion of a program corresponding to switch tabs disposed adjacent to said segments.

25. The indexing device of claim 24 wherein each of said segments corresponds to a temporal programming range.

26. The indexing device of claim 25 wherein said programming range is one day.

27. The indexing device of claim 25 wherein said programming range is 12 hours.

28. The indexing device of claim 25 wherein said programming range is one hour.

* * * * *